United States Patent [19]

Hibi

[11] Patent Number: 5,359,437
[45] Date of Patent: Oct. 25, 1994

[54] METHOD FOR UNDER-COLOR REMOVAL IN COLOR IMAGE FORMING APPARATUS

[75] Inventor: Yoshiharu Hibi, Kanagawa, Japan

[73] Assignee: Fuji Xerox Co., Ltd., Tokyo, Japan

[21] Appl. No.: 869,170

[22] Filed: Apr. 16, 1992

[30] Foreign Application Priority Data

Apr. 17, 1991 [JP] Japan .................. 3-085241

[51] Int. Cl.5 .................. H04N 1/46; G03F 3/00
[52] U.S. Cl. .................. 358/529; 358/530; 358/429; 358/455
[58] Field of Search .................. 358/500, 501, 515, 516, 358/517, 518, 529, 530, 537, 400, 401, 429, 443, 447, 455, 458

[56] References Cited

U.S. PATENT DOCUMENTS

| | | | |
|---|---|---|---|
| 3,615,441 | 10/1971 | Deneau | |
| 4,930,007 | 5/1990 | Sugiura | 358/75 |
| 5,126,838 | 6/1992 | Ohsawa et al. | 358/75 |
| 5,132,788 | 7/1992 | Hirota | 358/75 |
| 5,237,400 | 8/1993 | Washio et al. | 358/518 |

Primary Examiner—Bentsu Ro
Attorney, Agent, or Firm—Finnegan, Henderson, Farabow, Garrett & Dunner

[57] ABSTRACT

A method for under-color removal in a color image forming apparatus comprises color conversion means for converting separated color signals into first color output signals, first black generation means for calculating first black output signal based on the maximum and minimum values of the first color output signals obtained by the color conversion means, means for performing under-color removal to calculate second color output signals by correcting the first color output signals converted by the color conversion means based on the first black output signal generated by the first black generation means and then removing under-color values from the first color output signals, black amount correction means for calculating second black output signal by correcting the first black output signal obtained by the first black production means, and chroma correction means for correcting the second color output signals obtained by the means for performing under-color removal based on the second black output signal obtained by the black amount correction means.

7 Claims, 6 Drawing Sheets

FIG. 2(III)

METHOD FOR UNDER-COLOR REMOVAL IN COLOR IMAGE FORMING APPARATUS

BACKGROUND OF THE INVENTION

1. Field of the Invention

The present invention relates to a method for under-color removal in a color image forming apparatus converting separated color signals B, G and R into corresponding output signals for pigments Y, M and C through color conversion means, and outputting them.

2. Discussion of the Related Art

In a digital copying machine, analog signals generated by reading originals are converted into digital gray-scale values to carry out an image quality adjusting process for adjusting granularity, degradation, fineness, etc. and are recorded and reproduced in dot patterns. In particular, because the gray-scale values are stored digitally, various amendments and editing of the data are easily carried out in memory as well as image data processing for generating an image with high definition and reproducibility.

In a full color digital copying machine, an original is scanned optically and input signals B (blue), G (green) and R (red) are produced to be converted correctively into output signals Y (yellow), M (magenta) and C (cyan) for pigments (including all coloring materials such as toner, ink or ink donor film), and then reproduced as a full color image basically by outputting a combination of dot patterns of each pigment. Because equal amounts of all three pigments produce a gray shade, in actuality, an equal amount of the three components of output signals is removed (under-color removal) to avoid excessive use of the toner. However, if under-color removal is carried out, the decrease in the amount of toner causes a loss of color depth in an entire color image, and besides, the color reproducibility of simple under-color removal is not enough because the reproduction of black or gray and the reproduction of colors of a high degrees of saturation are in conflict with each other. To make up for this loss of color depth, and for producing gray tones, black pigment (K) is added in proportion to the amount of the pigments removed.

An outline of a conventional method for under-color removal in a digital color image forming apparatus proposed by the same inventor of the present invention (for example, Japanese Patent Application Unexamined Publication Hei. 2-118680) is now given.

Figure 5:
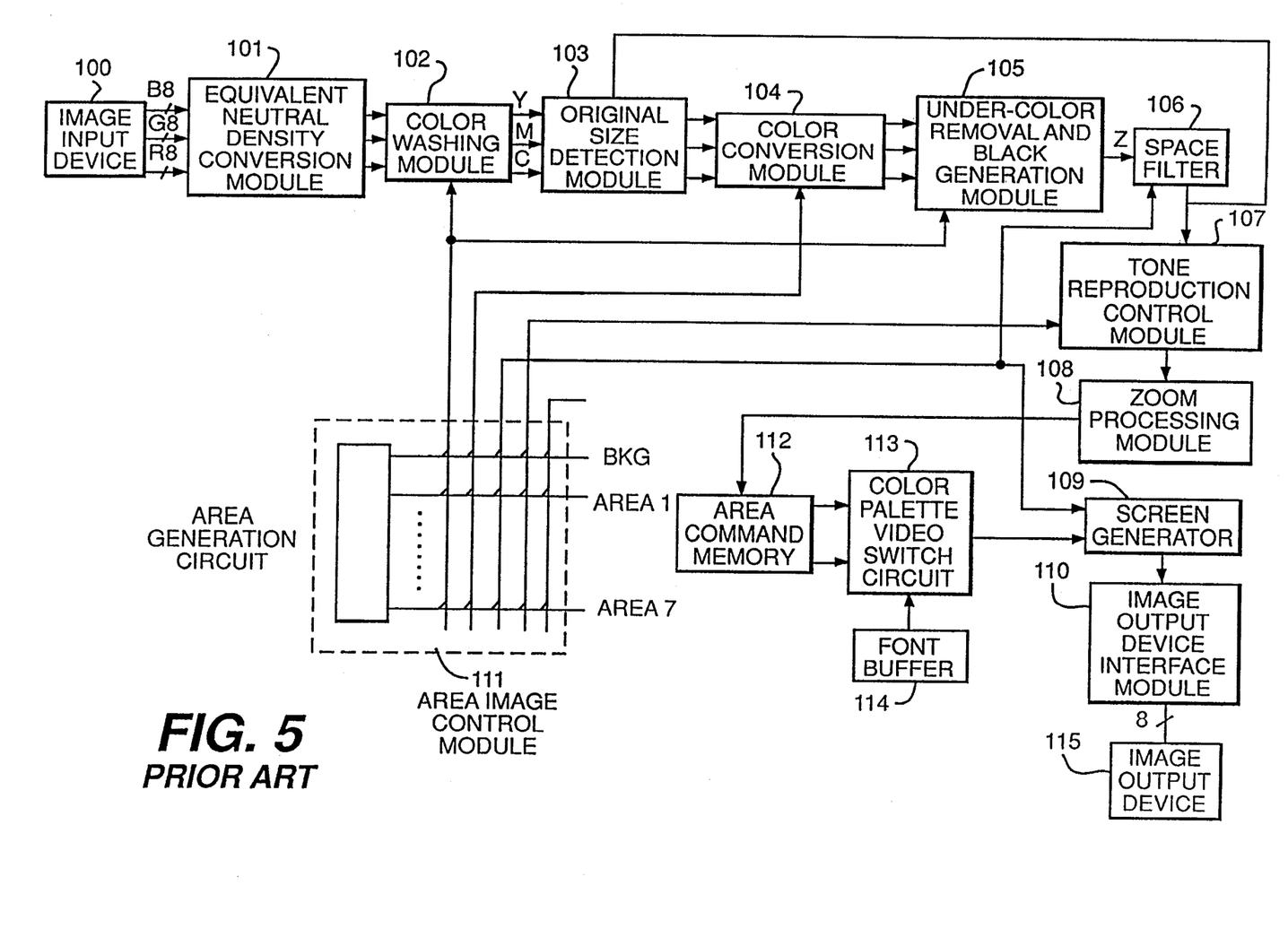
FIG. 5 is a diagram showing a configuration of a conventional digital color image forming apparatus.

FIG. 5 is a block diagram showing a configuration of an example of a digital color image forming apparatus.

In FIG. 5, an image input device 100 uses a CCD line sensor to read an original, performs color separation and produces the input signals B, G and R and then converts them into digital image data. An image output device 115 performs exposure and development by laser beams to reproduce the color image. From an equivalent neutral density conversion module 101 to an image output device interface 110 constitute an image processing system for the image data, where the B, G, R input signals are converted into the output signals for the pigments Y, M, C and K, and then an output signal corresponding to a developing color is selected and output at every developing cycle. In converting the input signals B, G and R into the output signals Y, M, C and K, a number of problems occur, such as how to control the balance of the colors, how to compensate for the colors corresponding to input characteristics of the image input device and output characteristics of the image output device, how to control the density and the contrast, how to control edge enhancement or unsharpness, and how to prevent moire effects, and so on.

The image input device 100 includes a CCD line sensor which scans for each of the primary colors blue, green and red at a size of 16 pixels/mm and outputs data with 24 bits (3 colors $\times$ 8 bits; 256 levels) per pixel. The CCD sensor has 16 pixels/mm and a length of 300 mm, and filters for input signals B, G and R are installed on its upper surface. The CCD sensor scans 16 lines/mm at a scan speed of 190.5 mm/sec, and then outputs input signals on each color at a rate of about 15 million pixels/sec. The image input device 100 converts information of reflectance into information of density and further converts them into digital signals by logarithmic conversion of analog signals for B, G and R picture elements.

The image processing system inputs B, G, R input signals to the image input device 100, performs various data processing to improve the gray-scale reproducibility, and so on, and selects an output signal for a development process color from the output signals Y, M, C and K to convert it into on/off signals, and then outputs to the image output device 115. The image processing system includes, as shown in FIG. 5, an equivalent neutral density conversion module 101 converting the color signals to obtain gray tones, a color masking module 102 converting input signals B, G and R into output signals in proportion to the amounts of toner for the signals Y, M, C calculated by a matrix operation. The image processing system also includes an original size detection module 103 detecting the document size in pre-scanning and erasing platen color (frame erasing) at the time of original reading, a color conversion module 104 converting designated colors in certain areas according to area signals being input to an area image control module, an under-color removal and black generation module 105 producing an appropriate amount of black without causing muddiness and reducing the same amount of Y, M and C in proportion to the amount of produced black, and inputting signal K and signals Y, M and C according to signals indicating monochrome mode and full color mode after under-color removal is performed, and a space filter 106 having functions for controlling edge unsharpness and eliminating moire effects. Further the image processing system includes a tone reproduction control module 107 performing density control, contrast control, negative and positive inversion, color balance control to improve reproducibility, a zoom processing module 108 performing magnification and compression in the main scanning direction, a screen generator 109 converting gray-scale toner signals for process colors into on/off binary toner signals and outputting them, an image output device interface module 110, an area image control module 111 having an area generation circuit and a switch matrix, and an edit control module having an area command memory 112, a color palette video switch circuit 113 and a font buffer 114.

The tone control system comprises the parts responsible for color adjustment including an equivalent neutral density conversion module 101, a color masking module 102, an under-color removal and black generation module 105 and a tone reproduction control module 107. The equivalent neutral density module 101 corrects for spectral characteristics of the light source for the image input device and characteristics of the dichroic mirror, color characteristics of the photoelectric element, color filters and lenses, and then converts into separated color signals ENDB, ENDG and ENDR with gray balance. The color masking module 102 carries out an operation using matrices which are for example, 3×3, 3×6 or 3×9, based on the proportion of the gray balanced separated color signals ENDB, ENDG and ENDR output from equivalent neutral density conversion module 101, and generates data for picture elements of gray balanced toner signals for three colors ENDY, ENDM and ENDC for a full color original, and generates an intensity signal for a monochrome original. The under-color removal and black generation module 105 generates a black signal K based on the proportion of the toner signals ENDY, ENDM and ENDC, and then reduces the values of toner signals ENDY, ENDM and ENDC (that is, performs under-color removal) according to the value of black signal K generated. In generating the black signal K, the maximum and minimum values of toner signals ENDY, ENDM and ENDC are determined by a maximum and minimum value detecting circuit, and the difference between the maximum and minimum values is calculated by a subtracter, and then a value derived from the difference by a chroma function is subtracted from the minimum value by the subtracter. In under-color removal, the under-color removal function converts the generated ENDK into ENDK' and the value of ENDK' is subtracted from each value of the toner signals ENDY, ENDM and ENDC by the subtracter. For a three-color or a monochrome copy, under-color removal and black production module 105 is by-passed because generation of black and under-color removal of ENDY, ENDM and ENDC are not carried out. A tone reproduction control module 107 determines a value of picture element data to be output according to picture element data having been input based on a tone reproduction control curve, and performs the control of density, contrast and color balance, negative and positive inversion and so on by altering the tone reproduction control curve.

In brief, the tone control system firstly performs the equivalent neutral density conversion on the separated color signals input to the image input device to make them gray balanced, and then carries out color masking to generate toner signals. The gray balance method is also applied in color masking, and moreover, black generation and under-color removal of the same amount from the toner signals ENDY', ENDM' and ENDC' are performed by the under-color removal function to make each toner signal always be the same amount with respect to gray. If values of the toner signals ENDY', ENDM' and ENDC' are same, toner signals Y, M and C are controlled by the tone reproduction control so that the image output device outputs gray, thereby control of gray balance in the image data processing system is carried out and reproducibility of gray in the image output system is improved.

In a conventional digital color image forming apparatus, under-color removal processing is performed on separated color signals B, G and R, and the pigment signals Y, M, C and K for the subtractive primaries are generated. However, if under-color removal is performed at low image densities, black cannot be added so much because it causes a lack of saturation and deterioration of lightness. Therefore, above-mentioned proposal by the inventor of the present invention applies a chroma function and the under-color removal function to make it practicable to perform under-color removal at low densities.

However, it is still difficult to make up for the lack of saturation and deterioration of lightness in a pictorial image when for example black characters in a color image are to be reproduced only by black toner, or under-color removal is to be carried out even at extremely low densities. And what is worse, black is a factor in muddiness in colored portions of the pictorial image, therefore, it causes problems of deterioration in tone reproduction.

SUMMARY OF THE INVENTION

The present invention has been made in view of the above circumstance and has as an object to solve the problems mentioned above.

Another object of the present invention is to make up for lack of saturation and deterioration of lightness in pictorial images when under-color removal is performed even at extremely low densities.

A further object of the present invention is to reduce muddiness in colored portions of reproduced images.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, the method for under-color removal in color image forming apparatus of this invention comprises color conversion means for converting separated color signals into first color output signals, first black generation means for calculating first black output signal based on the maximum and minimum values of the first color output signals obtained by said color conversion means, means for performing under-color removal to calculate second color output signals by correcting the first color output signals converted by the color conversion means based on the first black output signal generated by the first black production means and then removing values of under-color values from the first color output signals, black amount correction means for calculating second black output signal by correcting the first black output signal obtained by the first black production means, and chroma correction means for correcting the second color output signals obtained by the means for performing under-color removal based on the second black output signal obtained by the black amount correction means.

By the configuration described above, lack of saturation and deterioration of lightness in pictorial images can be made up for and muddiness in colored portion of the image is reduced even if under-color removal is carried out at extremely low densities because black generation and under color removal are carried out on output signal, and moreover, correction of amount for black and chroma adjustment are performed using predetermined coefficients.

BRIEF DESCRIPTION OF THE DRAWINGS

The accompanying drawings, which are incorporated in and constitute a part of this specification illustrate embodiment of the invention, together with the description, serve to explain the objects, advantages and principles of the invention. In the drawings.

FIGS. 2(I)–2(III) are line graphs showing examples of under-color addition parameters.

FIGS. 3(I)–3(II) are bar graphs illustrating differences in the amount of amendment due to difference of parameters.

DETAILED DESCRIPTION OF THE PREFERRED EMBODIMENTS

The embodiment of the present invention will be described in detail based on the drawings.

Figure 1:
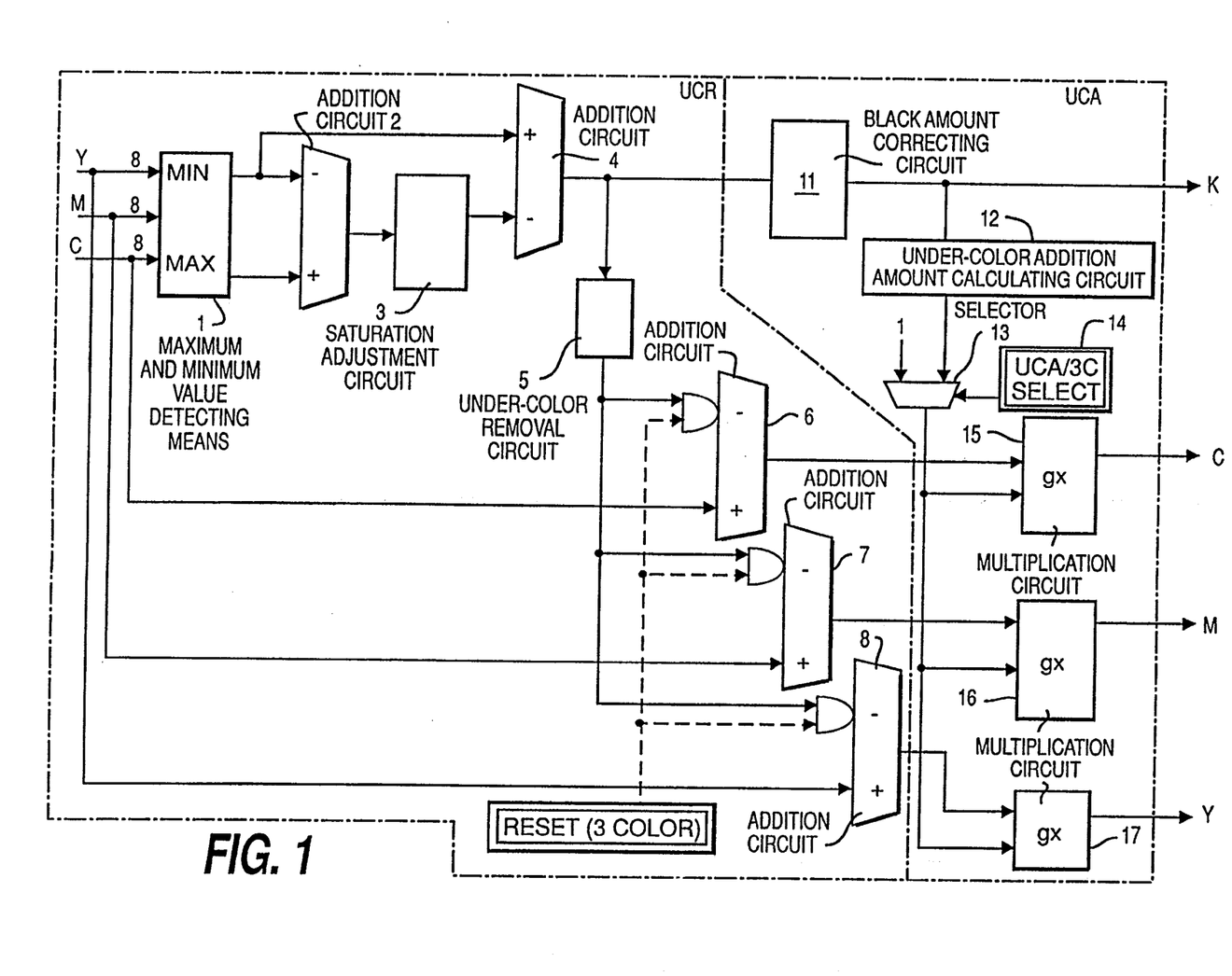
FIG. 1 is an explanatory diagram showing a configuration of an embodiment of a method for under-color removal in a color image forming apparatus according to the present invention.

In FIG. 1, a under-color removal module performs black generation and under-color removal. It comprises an addition circuit 4 calculating the amount of black according to the result of maximum and minimum value detecting means 1 for detecting maximum and minimum values of output signals Y, M and C, addition circuits 6–8 subtracting a certain value corresponding to the amount of black from values of output signals Y, M and C. The under-color addition module carrying out an adjustment to output signals Y, M and C after under-color removal comprises black amount adjustment circuit 11 to multiplication circuit 17.

The under-color removal module first detects maximum and minimum values of output signals Y, M and C by the maximum and minimum value detecting means 1 and calculates the difference between the maximum value and the minimum value by an addition circuit 2. The output of the addition circuit 2 is used as an address in read out data from the saturation adjustment circuit 3 in order to provide values of signals for colors which is smaller than values of signals given to gray. Black output signal K' is generated by subtracting the values of signals given to output of the saturation adjustment circuit 3 from the minimum value output by the maximum and minimum value detecting means 1 in the addition circuit 4. Further, the amount for under-color removal is calculated using the generated black input signal K' as an address for reading out the data from the under-color removal circuit 5. Then color output signals Y', M' and C' subject to under-color removal are obtained by subtracting the foregoing under-color removal amounts from values of the color output signals Y, M and C input by addition circuits 6–8.

In the under-color addition module, the final corrected black output signal K" is derived from the black output signal K' from the under-color removal module by the black amount correcting circuit 11. At the same time an under-color addition amount calculating circuit 12 reads out a corrective coefficient g, which the multiplication circuit 15–17 use in multiply the values of coloring output signals Y, M and C output from the under-color removal module.

The black amount correcting circuit 11, comprising a lookup table, for example, calculates black output signal K" by correcting black output signal K' so that, for example, it increases linearly from a start point which is identical to the point indicating the beginning of signal K' inputting. The corrective coefficient g obtained by the under-color addition amount calculating circuit 12 corrects the coloring input signals Y, M and C which have undergone under-color removal so that they will become greater with an increase in the black output signal K". In other words, the corrective coefficient g makes up for lack of saturation since the increase of the black output signal K" causes muddiness in colors or a lack of saturation in the image. The corrective coefficient g is given by the following formula:

$$g = \beta/(\alpha - X) + \gamma \text{ where } \gamma = 1 - \beta/\alpha$$

wherein X is a value of the black output signal K", α and β are parameters. Appropriate values are given to α and β, whereby the correcting curve is controlled and amounts for correction proper to coloring output signals Y', M' and C' after under-color removal are obtained. FIGS. 2(I)–(III) are graphs showing the relation between output signal K" and the amount of under-color addition as the parameters α and β in the above formula change, wherein the x-axis represents output signal K" and the y-axis represents the correction factor g for under-color addition.

Selector 13 determines from a UCA/3C signal whether or not the under-color addition is to be carried out, and selects accordingly the fixed value 1 if under-color addition is not to be carried out or the output from the under-color addition amount calculating circuit 12 if it is to be carried out.

Figure 2I:
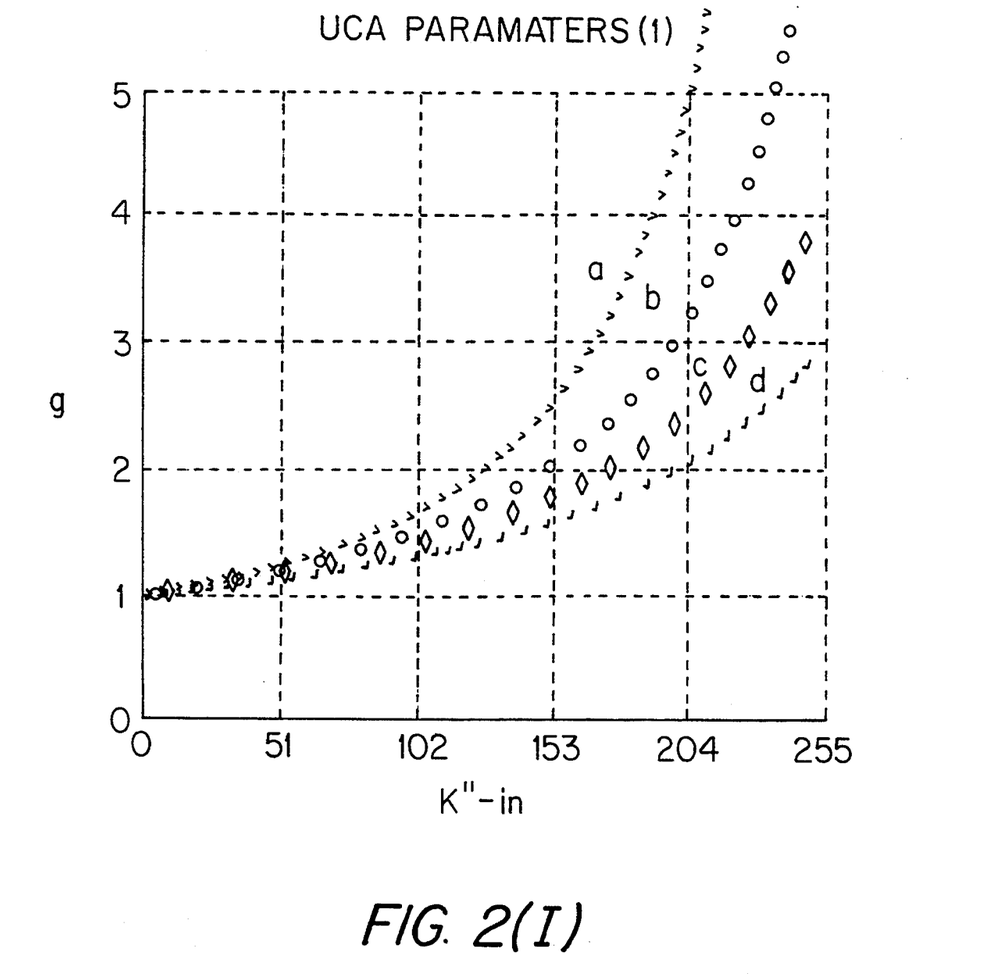
Figure 3:
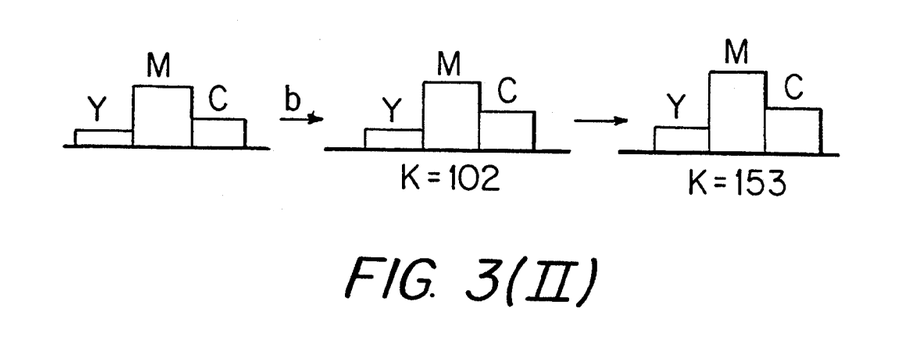
Figure 3I:
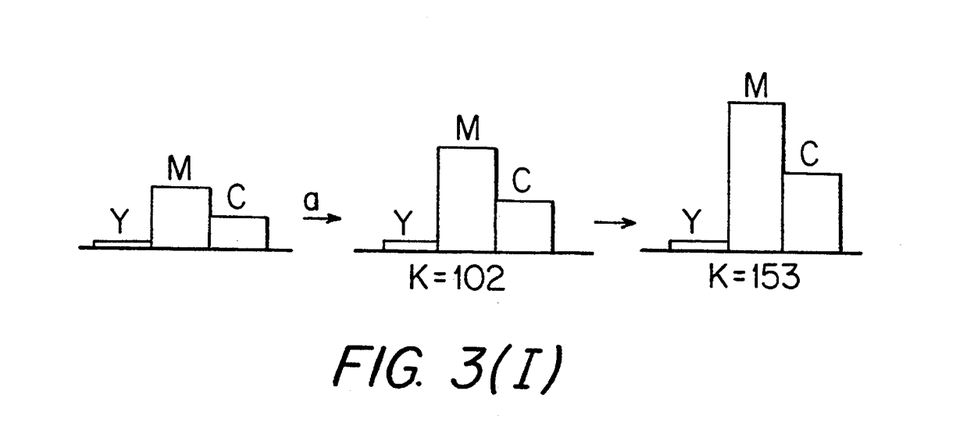

In FIG. 2, the values of K" are represented by gray levels 0–255, and lines (a), (b), (c) and (d) in (I) are examples where β is fixed at 255, while the other value of α is 256, 288, 320 or 352. According to the line (a), for example, when the value of black output signal K is 102, the correction factor g is approximately 1.7, whereas when the value of black output signal K is 153, the value of g is approximately 2.5. That is, as shown in FIG. 3 (I), the parameters are set such that the amount of under-color to be added greatly increases as the value of black output signal K" increases. On the other hand, according to the line (d), the under-color addition factor is approximately 1.3 when the value of black output signal K" is 102, and only approximately 1.6 when the value of black output signal K is 153. That is, when parameter α is 352, the amount of under-color addition is suppressed as shown in FIG. 3 (II).

Figure 2:
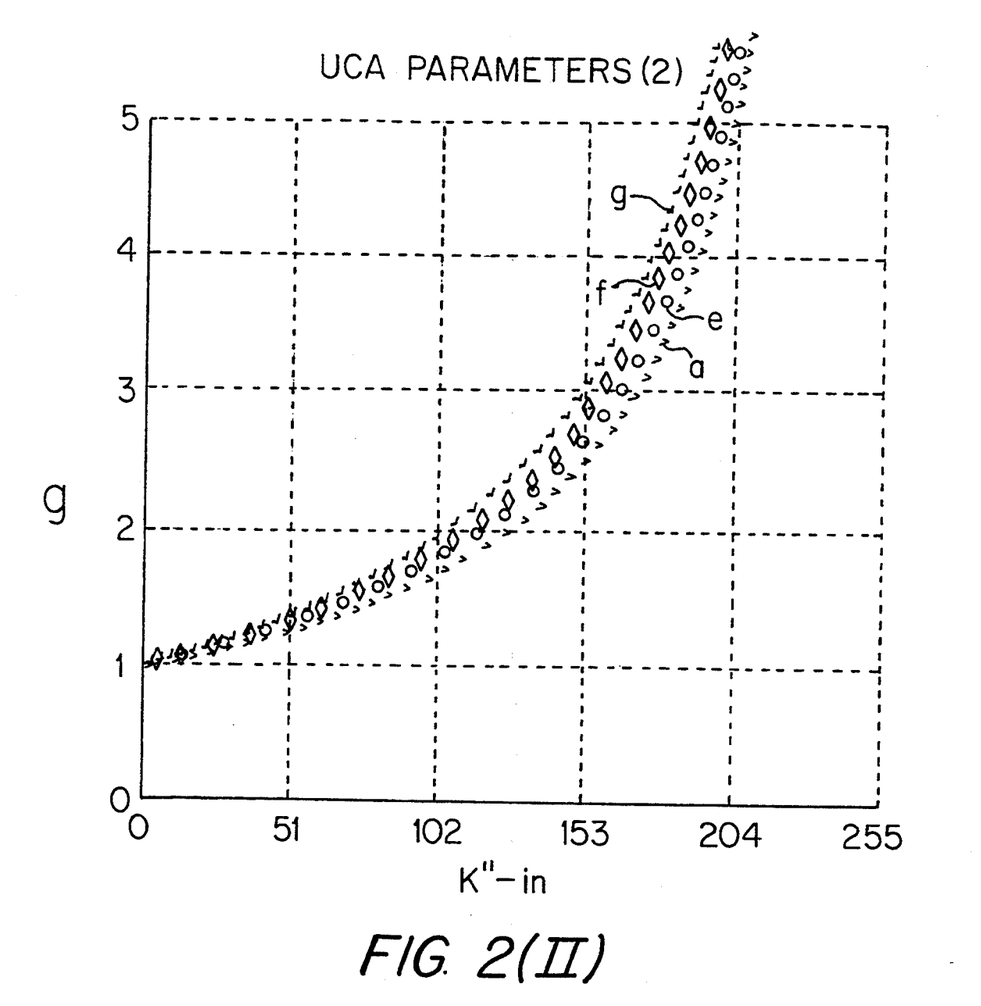

Curves (e), (f) and (g) in FIG. 2 (II) are examples where β is fixed at 255 and α is set to be 288, 320 and 352, and therefore, they have more exaggeration than the examples in FIG. 2 (I). On the other hand, (h), (i), (j) and (k) in FIG. 2 (III) are examples where the parameters are set to provide less exaggeration where α is fixed at 400 and β ranges from 255 to 400, 500 and 600.

The present invention increases the amount of under-color to be added as the value of black output signal K" becomes larger so that color output signals Y, M and C, if any, are exaggerated in accordance with the black output signal K" so that even when black is generated by the black generation and under-color removal function, a lack of saturation and so on are avoided. Such parameters can be varied depending on the area of images, for example, the parameter values shown as (a) in FIG. 2 (I) may be applied to areas of halftone image in photographs or the like. On the other hand, the parameter values shown as (d) in FIG. 2 (I) may be applied to areas including text, etc. They can also be varied according to the types of original or the user's tastes.

For hardware implementation, the above-mentioned formula can be provided by a divider, or the corrective curve shown in FIG. 2 can be divided into n areas and then each area approximated by a linear function. If the parameter values are fixed, it can be provided by random access memory using a lookup table.

Figure 4:
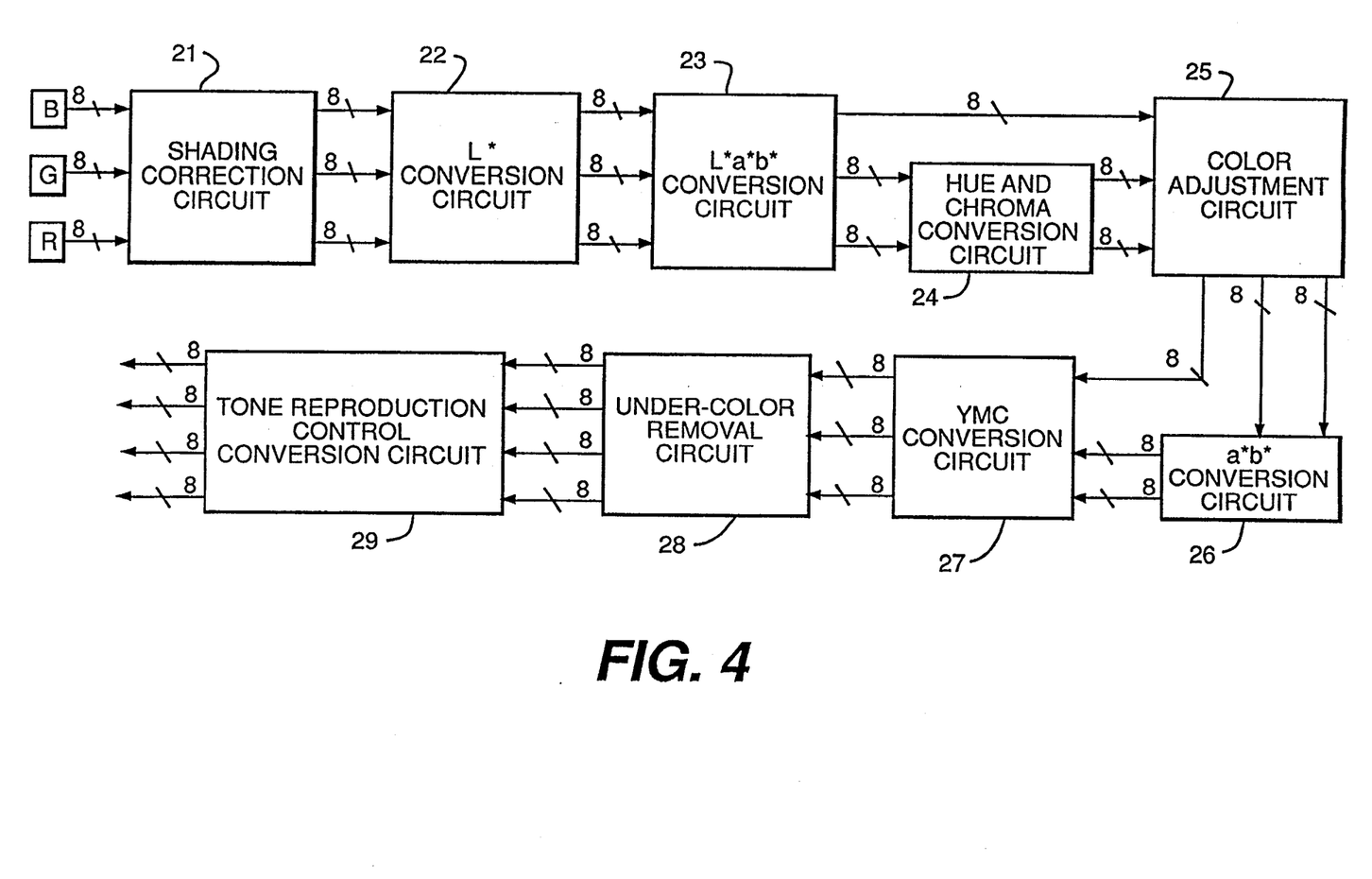
FIG. 4 is a diagram showing a configuration of a system employing a method for under-color removal in a color image forming apparatus according to the present invention.

FIG. 4 is a diagram showing a configuration of a system employing the method for under-color removal in a color image forming apparatus according to the present invention.

In the case where a CCD sensor is used for color separation and reading, shading correction circuit 21 performs adjustment per picture element on variation of B, G and R from one picture element to another, quality variation in the chips, quality variation from one picture element to another in the chips, unevenness of quantity of light, etc. L* conversion circuit 22 converts signals of reflectance read by CCD sensor into signals of lightness scale L*bgr, and an L*a*b* conversion circuit 23 converts signals of lightness scale L*bgr into standard system value (L*a*b*) signals where axis L* of the system values indicate intensity and two-dimensional surface of axis a* and axis b* orthogonal to the axis L* indicates saturation and hue. A hue and chroma conversion circuit 24 generates signals H (hue) and C (chroma) from system value (L*a*b*) signals. A color adjustment circuit 25 performs color adjustment so that, with respect to H (hue) $H'=H+\Delta H$, with respect to C (chroma) $C'=\gamma C$, and for V (value, and $V=L^*$ here) $V'=\beta V+\Delta V$, and then carries out color recognition and color conversion. An a*b* conversion circuit 26 reverses the effect of the hue and chroma conversion circuit 24 and converts signals H and C into a* and b*. A YMC conversion circuit 27 converts system value (L*a*b*) into output signals Y, M and C. An under-color removal circuit 28 employs the present invention described above. A tone reproduction control conversion circuit 29 carries out tone conversion in accordance with output characteristics of the image output device, and then carries out color balance control and contrast control.

The present invention is not limited to the above-described embodiment and various transformations are possible. For example, in the embodiment mentioned above, the degree of under-color addition correction is determined by the fundamental formula $1/(1-X)$. However, the degree of under-color addition correction can be set to increase according to an arbitrary curve as the value of black output signal becomes larger. Further, in cases such as shown in (a) and (b) in FIG. 2 (I), an upper limit to the degree of under-color addition correction can be, or the degree of under-color addition correction can be reduced.

According to the present invention, as seen from the foregoing description, in a case of color image reproduction where it is desirable that black letters are reproduced by black toner only, lack of saturation and deterioration of lightness in pictorial images are avoided by reinforcing black production and under-color removal, and by the process of under-color addition. That is, the value of the black output signal is made larger and the value of color output signals are reduced for black text. On the other hand, coloring output signals are exaggerated for a pictorial image. Further it is possible to perform under-color removal even at extremely low densities. In consequence, full color images of high quality are reproduced.

The foregoing description of a preferred embodiment of the invention has been presented for purpose of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A device for under-color removal in a color image forming apparatus comprising:
   color conversion means for converting separated color signals into first color output signals;
   first black generation means for calculating first black output signal based on the maximum and minimum values of the first color output signals obtained by said color conversion means;
   means for performing under-color removal to calculate second color output signals by correcting said first color output signals converted by said color conversion means based on said first black output signal generated by said first black generation means and then removing under-color values from said first color output signals;
   black amount correction means for calculating second black output signal by correcting said first black output signal obtained by said first black generation means; and
   chroma correction means for correcting said second color output signals obtained by said means for performing under-color removal based on said second black output signal obtained by said black amount correction means.

2. A device for under-color removal in a color image forming apparatus according to claim 1,
   wherein said black amount correction means corrects so that the amount of black increases in accordance with predetermined coefficients.

3. A device for under-color removal in a color image forming apparatus according to claim 1,
   wherein said black amount correction means applies no substantive correction when the amount of black to be added is zero, and applies a positive correction for all greater amounts of black to be added.

4. A device for under-color removal in a color image forming apparatus according to claim 1,
   wherein said chroma correction means comprises correction amount calculation means for calculating a correction amount for said second color output signals to be corrected based on said second color output signals obtained by said means for performing under-color removal, and multiplication means for multiplying said correction amount of the second color output signals obtained by said correction amount calculation means by said second color output signals obtained by said means for performing under-color removal.

5. A device for under-color removal in a color image forming apparatus according to claim 4, wherein said correction amount calculation means calculates the correction amount g by the following formula:

$$g = \beta/(\alpha - X) + \gamma \text{ where } \gamma = 1 - \beta/\alpha$$

wherein X is a value of said second black output signal, and $\alpha$ and $\beta$ are parameters.

6. A device for under-color removal in a color image forming apparatus according to claim 5; wherein said correction amount calculation means divides a value of said second black output signal into regions and calculates the amount of the second color output signals to be corrected by approximating said formula with a straight line segments.

7. A device for under-color removal in a color image forming apparatus according to claim 4; wherein said correction amount calculation means comprises a lookup table.

* * * * *